United States Patent [19]

Souders

[11] Patent Number: 5,393,474
[45] Date of Patent: Feb. 28, 1995

[54] METHOD FOR MOLDING A SHAPED PLASTIC TRIM PANEL

[75] Inventor: Steven L. Souders, Portsmouth, N.H.

[73] Assignee: Davidson Textron Inc., Dover, N.H.

[21] Appl. No.: 108,230

[22] Filed: Aug. 19, 1993

[51] Int. Cl.⁶ .............................................. B29C 43/40
[52] U.S. Cl. .................... 264/163; 264/316; 264/324; 425/292
[58] Field of Search ............... 264/163, 138, 316, 324; 425/289, 292

[56] References Cited

U.S. PATENT DOCUMENTS

| | | | |
|---|---|---|---|
| 2,270,187 | 1/1942 | Dulmage | 425/292 |
| 3,041,669 | 7/1962 | Marshall et al. | 425/292 |
| 3,173,174 | 3/1965 | Edwards | 425/292 |
| 3,321,562 | 3/1967 | Wanderer | 264/163 |
| 3,357,053 | 12/1967 | Lyon et al. | 425/292 |
| 3,377,658 | 4/1968 | Wilhoit et al. | 425/292 |
| 3,634,579 | 1/1972 | Matras et al. | 264/163 |
| 3,755,522 | 8/1973 | Jope et al. | 264/163 |
| 3,989,436 | 11/1976 | McNeeley et al. | 425/242 |
| 4,164,349 | 8/1978 | Hillgenberg | 264/163 |
| 4,242,074 | 12/1980 | Lake | 425/292 |
| 4,243,456 | 1/1981 | Cesano | 264/163 |
| 4,304,747 | 12/1981 | Lake | 264/156 |
| 4,459,092 | 7/1984 | Hatakeyama | 425/112 |
| 4,755,129 | 7/1988 | Baker et al. | 264/163 |
| 5,038,468 | 8/1991 | Wanatowicz | 264/163 |
| 5,182,065 | 1/1993 | Piotrowski et al. | 264/163 |
| 5,188,787 | 2/1993 | King et al. | 264/163 |
| 5,196,152 | 3/1993 | Gamache et al. | 264/163 |
| 5,284,608 | 2/1994 | Vismara | 264/163 |

*Primary Examiner*—Jay H. Woo
*Assistant Examiner*—Duane S. Smith
*Attorney, Agent, or Firm*—Reising, Ethington, Barnard, Perry & Milton

[57] ABSTRACT

A molding method for molding a shaped plastic trim panel from a wet moldable composite includes a blade for trimming the molded plastic trim panel while it is still in the molding apparatus. The lower mold member has an annular severing slot and annular clamping shoulders inwardly and outwardly of the severing slot. The upper mold member has an annular slot that is aligned with the severing slot of the lower mold member and annular clamping shoulders on either side of the slot. These shoulders cooperate with the clamping shoulders of the lower mold member to clamp the margin of the molded plastic trim panel that is shaped in the molding members. An annular cutting blade having a serrated cutting edge disposed in the slot of the upper mold member moves down vertically into the severing groove to cut through the clamped margin and trim the molded plastic trim panel.

3 Claims, 2 Drawing Sheets

METHOD FOR MOLDING A SHAPED PLASTIC TRIM PANEL

BACKGROUND OF THE INVENTION

This invention relates generally to the manufacture of shaped plastic trim panels and more particularly to an apparatus and method for molding a shaped plastic trim panel such as an automotive headliner, and trimming the panel while it is still in the mold.

One type of headliner is made from a wet moldable composite comprising a sheet of foam that is impregnated with an uncured liquid plastic material such as a thermal setting urethane precursor. The sheet of wet moldable composite is placed in an open compression mold in a hydraulic press. The press closes the mold to shape the composite sheet and cure the plastic material under appropriate heat and pressure. The shaped composite is then demolded and taken to another location where it is trimmed in a secondary operation. This method of molding and trimming the headliner in different operations is costly and time consuming.

U.S. Pat. No. 3,377,658 granted to Paul Junior Wilhoit and Gerald Kenneth Miller Apr. 16, 1968 discloses a carpet press mold and trimmer for molding contour matching floor carpets for automobiles. The press has a fixed lower mold and a moveable upper mold. The molds have continuous, generally rectangular cutting slots that are aligned when the mold is closed. Four traveling cutters project into the aligned slots and travel along the aligned cutting slots to trim the carpet while it is still in the mold. A compression ring located outside the cutting slots holds the peripheral portions of the carpet down during the cutting operation to increase the accuracy of the trim.

This method eliminates the need for trimming the carpet in a secondary operation which reduces manufacturing time and expense. However, the solution is not entirely satisfactory because the cutters must travel the periphery of the carpet after it is shaped in the molding press so that the trimming operation takes considerable time. Moreover, several cutters are involved which adds to the expense and complication of the operation. Another drawback is that the compression ring relies on the force of gravity to hold the outer peripheral portions of the carpet during the cutting operation. The compression ring is extremely heavy and difficult to manipulate which adds further cost and complexity to the cutting operation.

U.S. Pat. No. 4,328,067 granted to Franco Cesano May 4, 1982 discloses a method and apparatus for molding and laminating an automotive door panel in a heated press and for trimming the door panel while it is still in the press. This method and apparatus employs an annular element that has a cutting edge that cooperates with a shearing edge to trim a substrate layer and a secondary blade that cooperates an upper surface of the annular element to trim a coating layer.

This trimming operation is quicker than the travelling cutters used in the carpet trimming operation discussed above. However, neither the peripheral portion of the substrate layer nor the peripheral portion of the coating layer are held down outwardly of the cutting tools during the trimming operation. This reduces the accuracy and neatness of the cut. Such a trimming operation may be satisfactory for a laminated door panel where the trimmed edge of the substrate layer is wrapped by free margin portions of the coating layer. The accuracy and neatness of the cut edges of the substrate layer and the coating layer is not important because the cut edges of the substrate layer are covered by the margin portions of the coating layer and the cut edges of the coating layer are on the back side of the substrate layer.

Thus while this trimming operation is satisfactory for some purposes, it is not entirely satisfactory for in-mold trimming of trim panels such as automotive headliners that are made from a wet moldable composite rather than a laminate because these trim panels require cut edges that are accurate and neat.

SUMMARY OF THE INVENTION

The object of this invention is to provide a method and apparatus for molding and trimming a shaped plastic trim panel that may or may not be fiber filled in one continuous process or operation wherein the molded plastic trim panel is trimmed quickly, accurately and neatly.

A feature of the method and apparatus of this invention is that the method and apparatus employ a trimming arrangement in which the periphery of a molded plastic trim panel is clamped on both sides of a severing slot and trimmed by a blade that travels transversely into a severing slot to cut through the clamped periphery of the molded plastic trim panel.

Another feature of the method and apparatus of this invention is that the method and apparatus employ a trimming arrangement in which the periphery of a molded plastic trim panel is pinched off or clamped on both sides of a severing groove by two cooperating clamping shoulders that are integral parts of the respective mold members the shape of the mold plastic trim panel.

Still another feature of the method and apparatus of this invention is that the method and apparatus employ a trimming arrangement in which a clamped peripheral portion of a molded plastic trim panel is trimmed by a blade or blades housed in a slot in one mold member and protracted into a severing slot in a mating mold member to cut a neat and accurate edge on the molded trim panel quickly.

Still yet another feature of the method and apparatus of this invention is that the method and apparatus employ a trimming arrangement in which a clamped peripheral portion of a molded plastic trim panel is trimmed by blades housed in a slot in one mold member and protracted into a severing slot in a mating mold member to cut substantially the entire periphery of the trim panel at substantially the same time or in a sequential fashion to eliminate blade collision.

Still yet another feature of the method and apparatus of this invention is that the method and apparatus employ a trimming arrangement in which a peripheral portion of a molded trim panel is clamped on both sides of a severing slot in one mold member and trimmed by a blade or blades that are disposed in a slot in a mating mold member and that penetrate the severing slot to cut through the clamped peripheral portion of the trim panel and trim it completely without any need for further travel in the severing slot.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
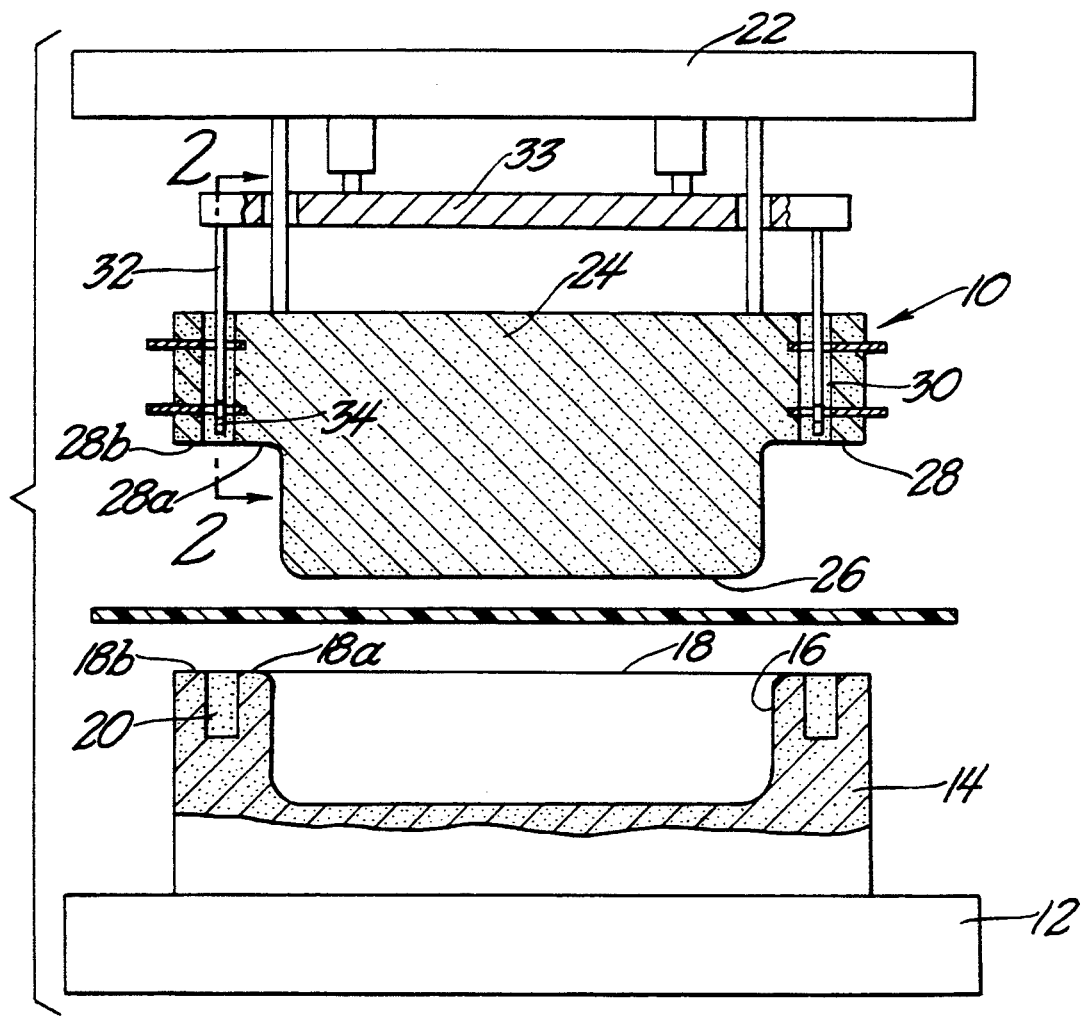
FIG. 1 is a semi-diagrammatic sectional view of the main elements of a molding apparatus of the invention showing the mold members in the opened position.

Referring now to the drawing, a molding apparatus 10 in accordance with the invention is illustrated semi-diagrammatically. The semi-diagrammatic view show the main elements of the molding apparatus 10 necessary for understanding the invention but omits conventional elements of molding presses such as press frame, guides, controls, temperature sensors, and the like in the interests of clarity.

The molding apparatus or press 10 compression molds a shaped plastic article such as an automotive headliner and then trims the molded plastic article while it is still in the molding press 10. The molding press 10 comprises a lower fixed platen 12 that supports a lower mold member 14 that has a profiled molding surface 16. The profiled molding surface 16 is generally concave and cavity like. Consequently the lower mold member 14 is conventionally labeled the female mold part.

The lower mold member 14 has a flat, horizontal annular clamping shoulder 18 that surrounds the molding surface 16. The annular clamping shoulder 18 has an annular vertical slot 20 that is disposed between the edges of the shoulder 18 so that the shoulder 18 has an annular clamping shoulder portion 18a inwardly of the vertical slot 20 and an annular clamping shoulder portion 18b outwardly of the vertical slot 20.

The molding press 10 further comprises an upper platen 22 that reciprocates on vertical guides through action of suitable hydraulic cylinders and controls. These conventional elements are not illustrated in the interests of clarity as stated above. An upper mold member 24 that has a profiled molding surface 26 is attached to the moveable upper platen 22. The profiled molding surface 26 is generally convex or protrusion like and consequently the upper mold member 24 is conventionally labeled the male mold part.

The upper mold member 24 also has a flat horizontal annular clamping shoulder 28. The clamping shoulder 28 surrounds the molding surface 26 and it is aligned with the annular clamping shoulder 18 of the lower mold 14. The annular clamping shoulder 28 includes a vertical annular slot 30 that extends through the upper mold member 24. This slot 30 is disposed between the edges of the annular shoulder 28 so that the annular clamping shoulder 28 has an inner annular clamping portion 28a and an outer clamping portion 28b on opposite sides of the annular slot 30. The slot 30 and inner and outer clamping portions 28a and 28b are aligned with the annular slot 20 and inner and outer annular clamping portions 18a and 18b of the lower mold 14 respectively.

Figure 2:
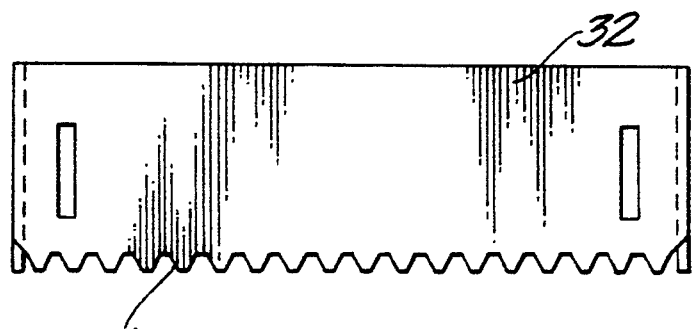
FIG. 2 is a sectional view taken substantially along the line 2—2 of FIG. 1 looking in the direction of the arrows.
Figure 3:
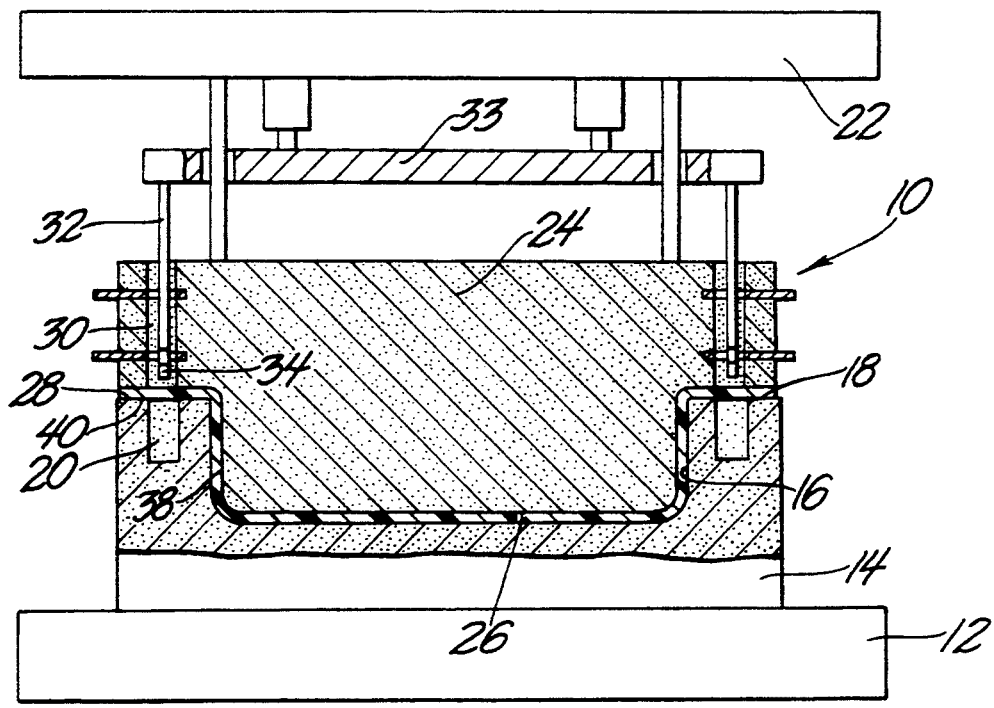
FIG. 3 is a semi-diagrammatic sectional view of the main elements of the molding apparatus of FIG. 1 showing the mold members in the closed position for molding a headliner.
Figure 4:
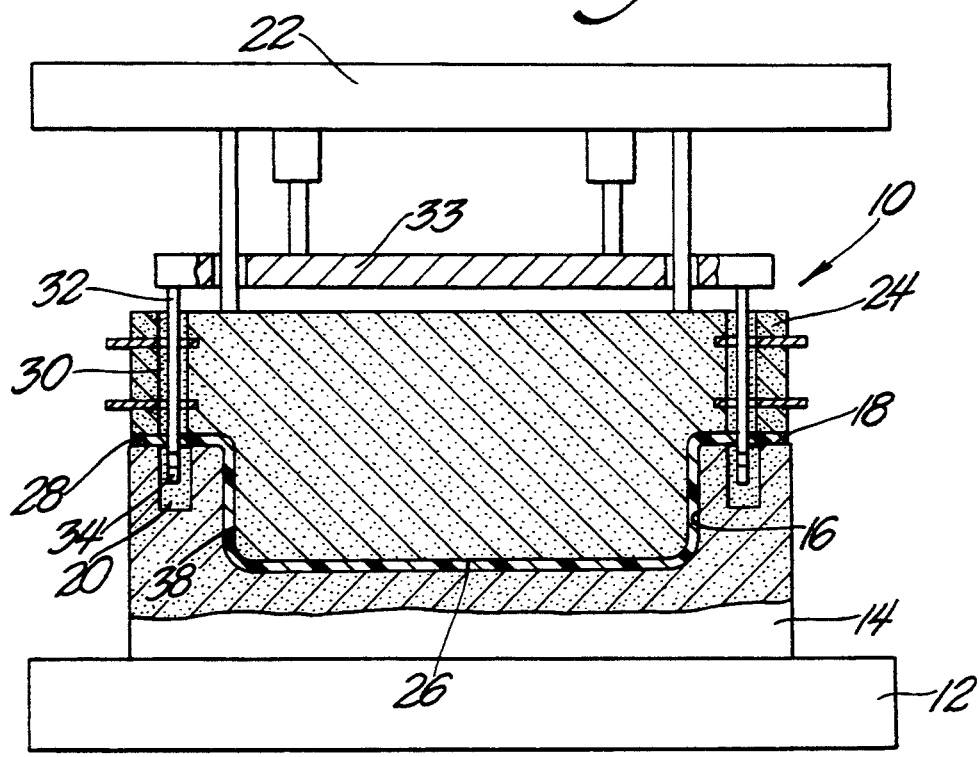
FIG. 4 is a semi-diagrammatic sectional view of the main elements of the molding apparatus of FIG. 1 showing the mold members in the closed position and the trim blades extended for trimming the molded headliner.

The molding press 10 further comprises an annular cutting blade 32 that has a lower serrated cutting edge 34 as shown in FIG. 2. The cutting blade 32 is attached to the moveable platen 22 by a moveable plate 33 that reciprocates the cutting blade 32 in the vertical annular slot 30. The annular cutting blade 32 reciprocates vertically relative to the upper mold member 24 between a retracted position where the cutting edge 34 lies within the slot 30 and above the clamping shoulder 28 as shown in FIGS. 1 and 3 and a protracted cutting position. In the protracted cutting position the lower end of the cutting blade 32 protrudes out of the slot 32 and penetrates into the mating severing slot 20 to cut through the peripheral portion of the headliner as shown in FIG. 4. The cutting blade 34 is attached to the plate 33 and reciprocated by means of electric or hydraulic motors between the plate 33 and the moveable platen 22.

The width of the slots 20 and 30 is exaggerated in FIGS. 1, 3 and 4 in the interests of clarity. In actual practice, the slots 20 and 30 are narrower and preferably just slightly wider than the width of the cutting blade 32 so that the slots 20 and 30 guide the cutting blade 32 during the trimming operation.

The upper mold member 26 attached to the upper platen 22 and the lower mold member 14 supported on the lower platen 12 reciprocate relative to each other between a mold open position shown in FIG. 1 and a mold closed position shown in FIGS. 3 and 4.

In the mold open position the mold members 14 and 24 are spaced apart far enough so that a sheet of feed stock 36 fits between the mold members 14 and 24 as shown in FIG. 1. In the case of molded plastic headliners, the feed stock 32 is generally a foam sheet that is impregnated with a liquid urethane precursor or other suitable thermosetting plastic material.

This sheet of feed stock 32 is then compression molded by moving the mold members 14 and 24 to the closed position shown in FIG. 3 where the sheet 36 is shaped by the profiled surfaces 16 and 26 and the liquid plastic impregnating material is cured by the appropriate amount of heat and pressure in a conventional manner to form a shaped headliner 38 as shown in FIG. 3. The heat is applied in a conventional manner, for instance by heated mold members and consequently the heating detail has been omitted in the interests of clarity as stated above.

The molding press 10 also trims the shaped headliner 38 after the liquid plastic impregnating material is cured while the shaped headliner 38 is still in the molding press 10. In order to trim the shaped headliner 38 accurately, the cooperating mold members 14 and 24 include the annular clamping shoulders 18 and 28 that firmly clamp the annular margin 40 of the shaped headliner 38 on both sides of the cutting blade 32 for the trimming operation. That is, the annular shoulder portions 18a and 28b clamp the entire periphery of the margin inwardly of the cutting blade 32 while the annular shoulder portions 18b and 28b clamp the entire periphery of the margin outwardly of the cutting blade 32. The cutting blade 32 is then actuated so that it moves down vertically to protract from the slot 30 and penetrate into the severing slot 20 cutting through the clamped margin 40 of the shaped headliner 38 between the inner and outer sets of clamping shoulders 18a, 28a; and 18b, 28b.

This provides a clean, neat, accurate cut edge very quickly.

The cutting blade 32 is then retracted and the upper platen 22 is raised to the mold open position shown in FIG. 1 where the trimmed headliner 38 and remnant of the margin 40 are removed.

While the method and apparatus of this invention have been described in connection with a molding press that has a fixed lower mold member and a moveable upper mold member, it can obviously be used in connection with a molding press that has a fixed upper mold member and a lower moveable mold member or in any environment where the mold members move relative to each other for that matter. Similarly the method and apparatus of this invention has been described in connection with a single annular cutting blade whereas other cutting blade configurations, such as several straight cutting blades arranged to provide a continuous annular periphery could be used. Moreover the multiple cutting blades can be actuated simultaneously or sequentially to avoid a blade collision. It is also possible to punch holes for dome lights, visor mountings, datum location, etc. as part of the trimming operation. Furthermore the slots 20 and 30 and the cutting blade 32 can be aligned on an angle for an angular cut instead of the perpendicular cut that is shown.

In other words, the invention has been described in an illustrative manner, and it is to be understood that the terminology which has been used is intended to be in the nature of words of description rather than of limitation.

Obviously, many other modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method for molding a shaped plastic trim panel in a molding press and trimming the shaped plastic trim panel in one continuous operation comprising the steps of:
    molding a shaped plastic trim panel in a press having an upper mold member and a lower mold member in which one mold member has a severing slot outwardly of a molding surface and clamping shoulders on opposite sides of the severing slot and the other mold member has cooperating clamping shoulders that clamp a peripheral margin of the molded plastic trim panel that is shaped in the mold members, and
    trimming the molded plastic trim panel while the molded plastic trim panel is still in the mold members with a cutting blade that moves relative to the other mold member from a retracted position to a protracted cutting position penetrating vertically into the severing slot to cut through the clamped peripheral margin of the shaped plastic trim panel between the clamping shoulders on opposite sides of the slot and trim the molded plastic trim panel.

2. A method for molding a shaped plastic trim panel and trimming the shaped plastic trim panel comprising the steps of:
    providing a press for molding a shaped plastic trim panel having an upper mold member and a lower mold member that move relative to each other between a mold open position and a closed molding position, one of the mold members having a severing slot outwardly of a molding surface and clamping shoulders on opposite sides of the severing slot, the other of said mold members having a cutting blade that moves relative to the other said mold member between a retracted position and a protracted cutting position penetrating into the severing slot and cooperating clamping shoulders on opposite sides of the cutting blade,
    molding the shaped plastic trim member in the press by moving the upper and lower mold members to the mold closed molding position with the cutting blade in the retracted position so that the molded plastic trim panel has a peripheral margin that is clamped on opposite sides of the severing slot by the clamping shoulders of the one mold member and the cooperating clamping shoulders of the other said mold member, and
    trimming the shaped molded plastic trim panel while the upper and lower mold members are in the closed molding position by moving the cutting blade relative to the other said mold member from the retracted position to the protracted cutting position so that the cutting blade penetrates into the severing slot and cuts through the peripheral margin of the shaped molded plastic trim panel between clamped portions of the peripheral margin portions on opposite sides of the severing slot.

3. A method for molding a shaped plastic trim panel and trimming the shaped plastic trim panel comprising the steps of:
    molding a shaped plastic trim panel in a press by moving two mold members to a closed molding position so that the shaped molded plastic trim panel has a peripheral margin,
    inner and outer portions of the peripheral margin of the shaped molded plastic trim panel being clamped on opposite sides of a severing slot when the mold members are in the closed molded position, and
    then trimming the shaped molded plastic trim panel by protracting a cutting blade into the severing slot to cut through the peripheral margin of the shaped molded plastic trim panel between the clamped inner and outer portions of the peripheral margin on opposite sides of the severing slot.

* * * * *